United States Patent [19]

Groose et al.

[11] Patent Number: 4,531,953

[45] Date of Patent: Jul. 30, 1985

[54] SUBLIMATION OF AMINE COMPOUNDS ON ACTIVATED CARBON PORE SURFACES

[75] Inventors: James E. Groose, Oakdale; Paul K. T. Liu, Pittsburgh, both of Pa.

[73] Assignee: Calgon Corporation, Pittsburgh, Pa.

[21] Appl. No.: 506,486

[22] Filed: Jun. 21, 1983

[51] Int. Cl.$^3$ .............................................. B01D 53/04
[52] U.S. Cl. ........................................ 55/74; 55/387; 427/212; 428/408; 502/401
[58] Field of Search ............................ 55/71, 74, 387; 423/236; 427/212; 428/408; 502/150, 401

[56] References Cited

U.S. PATENT DOCUMENTS

| | | | |
|---|---|---|---|
| 1,781,664 | 11/1930 | Rockwell | 423/236 |
| 2,400,709 | 5/1946 | Patrick, Jr. | 502/401 X |
| 2,511,288 | 6/1950 | Morrell et al. | 252/447 |
| 2,511,290 | 6/1950 | Morrell et al. | 252/447 |
| 2,523,875 | 9/1950 | Morrell et al. | 252/447 |
| 2,612,434 | 9/1952 | Rockwell et al. | 423/236 |
| 2,818,323 | 12/1957 | Haensel | 23/2 |
| 2,920,050 | 1/1960 | Blacet et al. | 252/447 |
| 2,920,051 | 1/1960 | Wiig et al. | 252/447 |
| 2,963,441 | 12/1960 | Dolian et al. | 252/190 |
| 3,453,807 | 7/1969 | Taylor | 55/71 |
| 3,489,507 | 1/1970 | Gardner et al. | 55/74 X |
| 3,491,031 | 1/1970 | Stoneburner | 252/411 |
| 3,532,637 | 10/1970 | Zeff et al. | 252/190 |
| 3,796,023 | 3/1974 | Raduly | 55/71 X |
| 3,901,818 | 8/1975 | Durand et al. | 502/401 X |
| 4,016,242 | 4/1977 | Deitz et al. | 55/71 X |
| 4,040,802 | 8/1977 | Deitz et al. | 55/71 |
| 4,070,300 | 1/1978 | Moroni et al. | 252/190 |
| 4,204,980 | 5/1980 | Pasha et al. | 55/71 X |
| 4,222,892 | 9/1980 | Motojima et al. | 502/401 |
| 4,293,317 | 10/1981 | Kovach | 55/71 |

FOREIGN PATENT DOCUMENTS

| | | | |
|---|---|---|---|
| 1575501 | 7/1969 | France . | |
| 8102256 | 8/1981 | World Intel. Prop. Org. | 55/71 |
| 1123822 | 8/1968 | United Kingdom | 502/401 |
| 1157376 | 7/1969 | United Kingdom . | |
| 186406 | 10/1966 | U.S.S.R. | 502/401 |

OTHER PUBLICATIONS

Maggs et al., "Enhancement of CK Protection by Use of TEDA Impregnated Charcoal", Technical Paper No. 225, Chemical Defence Establishment, Porton Down, Salisbury, Wilts, (Jun. 1977).
Alves et al., "The HCN and CNCl Protection Afforded by ASC and ASC/TEDA Charcoals", Chemical Defence Establishment, Porton Down, Salisbury, Wilts, (Jul. 1982).
Chapter 2 through 8 of vol. 1, Summary Technical Report of Division 10, NDRC, "Military Problems with Aerosols and Nonpersistent Gases", pp. 81–84, (believed to have been published in 1945).
Military Specification: Charcoal, Activated, Impregnated, ASC, (Oct. 1976).

*Primary Examiner*—Robert Spitzer
*Attorney, Agent, or Firm*—Michael C. Sudol; R. Brent Olson; William C. Mitchell

[57] ABSTRACT

The instant invention is directed to an activated carbon impregnated with 0.1 to 10 percent, by weight, of an amine compound, which is solid and sublimes at 40° C. or above, and having a moisture content after impregnation of 5.0 percent or less, by weight.

The instant invention is also directed to a process for impregnating carbon comprising allowing an amine compound, which is solid and sublimes at the temperature at which said amine is applied, to sublime in the presence of an activated carbon.

The instant invention is also directed to the use of the impregnated carbon in removing toxic gases from a gas stream comprising passing the gas stream through the impregnated carbon.

10 Claims, No Drawings

SUBLIMATION OF AMINE COMPOUNDS ON ACTIVATED CARBON PORE SURFACES

BACKGROUND OF THE INVENTION

Activated carbons have been used since World War I as an adsorbent to remove poisonous contaminants, principally cyanogen chloride, from air or other gases containing the poisonous contaminant. It has been used principally in gas masks to provide protection against chemical warfare agents, such as cyanogen chloride (CK) and chloropicrin (PS). Numerous toxic gases and liquids are used as chemical warfare agents. In testing the desirability of a particular carbon, cyanogen chloride is generally used as a test gas because the presence and effects of moisture greatly influence the ability of the carbon to remove this gas. Chloropicirin is selected as an additional test gas to measure the physical adsorption capacity of the carbon. The principal carbon used was a whetlerite carbon, a copper-treated carbon adapted to serve as an adsorbent for poisonous gas, and named after the first inventors, Joshua C. Whetzell and E. W. Fuller.

Additional metals have been impregnated in activated carbon to improve on its adsorption capabilities; e.g. ASC Whetlerite carbon, a copper, silver and chromium impregnated carbon. Cyanogen chloride removal is enhanced significantly by the copper and chromium impregnants in the ASC Whetlerite carbon. The cyanogen chloride, in part, reacts with the metal impregnant. On the other hand, some toxic gases, such as chloropicrin, are removed primarily by adsorption on the carbon pore surface, rather than by reaction with the metal impregnants. The available carbon pore surface (i.e. adsorption capacity) is, however, reduced by the added impregnants. Therefore, a good Whetlerite carbon product must have a careful balance of metal impregnant versus available pore surface. One of the principal drawbacks of ASC Whetlerite carbon is the deterioration of the cyanogen chloride removal caused by aging, which is defined as the equilibration over time of the carbon or impregnants with moisture picked up by the carbon.

More recently, organic compounds have been added to the ASC Whetlerite carbon, for example pyridine, picoline and triethylene diamine (TEDA) to reduce the aging effect. Since pyridine and picoline are liquids at room temperature, they are easily added to the carbon. TEDA, on the other hand, is a solid at room temperature and due to its limited solubility, has generally been added as an aqueous solution. Triethylene diamine impregnated ASC Whetlerite carbon has the advantage that it will, however, maintain its capacity to remove cyanogen chloride, in particular after aging, better than the pyridine or picoline impregnated carbons.

The instant invention is directed to an improved method of impregnating carbons with solid compounds, such as TEDA. The impregnated carbons of the instant invention have the capacity to remove cyanogen chloride over a longer period than prior art carbons. This has been accomplished by using triethylene diamine or other amine compounds which are solid and adding them to the carbon by sublimation, rather than as an aqueous solution. Since water is not added along with the TEDA, more adsorption capacity is retained for physical adsorption.

DESCRIPTION OF THE INVENTION

The instant invention is directed to an activated carbon impregnated with 0.1 to 10 percent, by weight, of an amine compound which is solid and sublimes at 40° C. or above, and having a moisture content after impregnation of 5.0 percent or less, by weight.

The instant invention is also directed to a process for impregnating carbon comprising allowing an amine compound, which is solid and sublimes at the temperature at which said amine is applied, to sublime in the presence of an activated carbon.

The instant invention is also directed to a process for the removal of toxic gases from a gas stream comprising passing the gas stream through an activated carbon impregnated with 0.1 to 10 percent, by weight, of an amine compound, which is solid and sublimes at 40° C. or above, and having a moisture content after impregnation of 5.0 percent or less, by weight.

The instant invention is directed to a process for the removal of toxic gases from a gas stream comprising passing the gas stream through an amine impregnated activated carbon which was prepared by allowing an amine compound, which is solid and sublimes at the temperature at which said amine is applied, to sublime in the presence of an activated carbon.

Any activated carbon may be used in the instant invention. The preferred class of carbons are the Whetlerite carbons, i.e. a metal impregnated carbon, for example as described in U.S. Pat. Nos. 2,920,050; 2,523,875; 2,963,441; 1,789,194 and 2,511,288. The most preferred carbon is an ASC Whetlerite carbon, i.e. a copper, silver and chromium impregnated carbon.

The impregnants contemplated by the instant invention are amine compounds which are solid and sublime at the temperature at which said amine is applied, preferably at room temperature. The most preferred amines are those which, in addition, are, in fact, solid and sublime at 40° C. or above, most preferably 80° C. or above. Examples of amines include triethylene diamine, quinuclidine, quinoxaline, ethyl triethylene diamine, 1,6-hexanediamine, pyrazine, carbazole, 1,3,5-triazine and mixtures thereof.

The amine compounds are preferably placed in a container, most preferably closed, with the carbon to be impregnated. The container is not critical, but rather some means to diffuse the vapor into the carbon pores. A container will suffice. The amine is allowed to sublime into the activated carbon. No water or moisture is added, and the atmosphere is preferably dry. The rate of sublimation depends on the specific amine selected and the temperature employed. Generally, the amines will sufficiently impregnate the carbon within about 24 hours. It is generally preferred to sublime at room temperature. Heating, however, will speed the rate of sublimation. Care must be taken, however, not to raise the temperature to a level which causes a chemical change in the impregnant.

Sublimation is the passing from a solid to a gas phase without going through a liquid phase. The rate of sublimation will depend primarily upon the amine selected, the temperature and the contact surface area. The faster the rate of sublimation of the amine at room temperature with the least amount of grinding, is generally more desirable from an economic standpoint. The rate of sublimation from a practical standpoint should be such that a reasonable amount of the amine will deposit at least 0.1 percent, by weight, of impregnant on the carbon pore surface within 48 hours at the temperature used, ideally without the cost of heating or cooling. From an economic standpoint, it is preferred that the percent of amine used be no greater than twice the percent of dosage desired, preferably no greater than the percent of dosage desired, based on the weight of the carbon.

The moisture content in the impregnated carbons produced by the process of the instant invention is 5 percent or less, preferably 3 percent or less, more preferably 2 percent or less, and most preferably 1 percent or less, by weight. In fact, impregnated carbons may be produced with a moisture content of about 0.5 percent or less.

EXAMPLES

Various additives were impregnated in an ASC Whetlerite carbon, particle size between U.S mesh 12 and 30, manufactured by Calgon Carbon Corporation. Those compounds which sublimed at room temperature or higher, e.g. quinuclidine and triethylene diamine, were mixed at room temperature with the granular ASC carbon particles, placed in a container and the sublimed vapors were adsorbed on the ASC carbon within about 24 hours. A liquid-phase loading was employed for those compounds which were liquid at room temperature, for example dodecylamine, tetraethylene pentamine and p-phenylene diamine. These compounds were sprayed directly on the carbon surface through a nozzle spraying device. 1,3-diaminopropane, which is a liquid at room temperature, was added by vapor-phase loading techniques. The carbon was placed in a closed container and heated to 115° C. The heat was then removed and 1,3-diaminopropane was placed in the carbon container. 1,3-diaminopropane loaded about 1.5 percent of the compound on the carbon within 6 hours. Quinoxaline was a solid when mixed with the carbon, however, the temperature rose due to an exothermic reaction, the quinoxaline melted at 28° C. and partially decomposed. Each of the carbons was impregnated with 1.5 percent of organic impregnant, using 1.5 percent of impregnant, based on the weight of the carbon. Each of the carbons were then tested for its cyanogen chloride (CK) life, as received and aged. The "as received" test contained 4 mg/l cyanogen chloride in air and the flow rate was 50 l/min. Four M11 canisters, minus the filter element and bottom cover, containing 250± 5 ml of impregnated carbon were tested. The test was continued until the effluent concentration reached 0.008 mg/l. The CK life test, thus, measures the time, in minutes, that it takes for the level of cyanogen chloride in the effluent to increase to 0.008 mg/l. The CK lives reported in Table I are the average of 4 M11 canisters, minus the filter element and bottom cover. In the "aged" CK lift test, 4 canisters were aged for 7 days in air at a temperature of 114°±2° F. and a relative humidity of 85±5 percent. The canisters were aged with inlet openings unobstructed and the outlets, or nozzles, stoppered, or closed, with a steel cap, or cap closure. The average of the 4 canisters were expressed to the nearest minute. The test results are summarized in Table I.

TABLE I

| Impregnant | CK Life (As Received, Minutes) | CK Life (Aged, Minutes) | Moisture Content of Impregnated Carbon (%) |
|---|---|---|---|
| Blank: | | | |
| None | 24 | 10 | 0.5 |
| None | 25 | 10 | 0.5 |
| None | 24 | 5 | 0.5 |
| Instant Invention: | | | |
| Triethylene diamine | 53 | 45 | 0.5 |
| Quinuclidine | 36 | 35 | 0.5 |
| Comparison Examples: | | | |
| Other Amines or Conditions: | | | |
| 1,3-diaminopropane (vapor at 115° C.) | 26 | 13 | 0.5 |
| Dodecylamine (liquid) | 20 | 5 | 0.6 |
| Tetraethylene pentamine (liquid) | 23 | 14 | 0.5 |
| p-phenylene diamine (liquid) | 5 | 2 | 0.5 |
| Qinoxaline (decomposed) | 25 | 7 | 0.5 |
| Carboxyls: | | | |
| Acetic acid | 5 | 2 | 0.5 |
| Salicylic acid | 2 | 1 | 0.5 |
| 2-picolinic acid | 22 | 4 | 0.5 |
| Hydroxyls: | | | |
| Propanol | 15 | 3 | 0.5 |
| Resorcinol | 19 | 6 | 1.5 |
| Aldehydes/Ketones: | | | |
| Acetylacetone | 20 | 3 | 0.5 |
| Benzaldehyde | 18 | 4 | 0.5 |
| Pyrrolidinone | 16 | 5 | 0.5 |
| Sulfur-Containing: | | | |
| Propanethiol | 18 | 5 | 0.5 |
| 3-pyridine sulfonic acid | 8 | 3 | 1.5 |
| Phenyl isothiocyanate | 15 | 3 | 0.5 |

ASC Whetlerite carbon containing 1.5 percent triethylene diamine and varying concentrations of moisture were tested, as outlined above, for its CK life, as received and aged. The results are summarized in Table II. The CK life generally decreased, both as received and aged, with an increase in moisture content.

TABLE II

| Moisture Impact on CK Removal | | |
|---|---|---|
| Moisture Content (Percent) | CK Life (As Received, Minutes) | CK Life (Aged, Minutes) |
| 0.5 | 53 | 45 |
| 3.8 | 42 | 37 |
| 13.0 | 34 | 34 |
| 15.5 | 38 | 26 |

ASC Whetlerite carbon impregnated with 1.5 weight percent triethylene diamine was tested for its dry chloropicrin (PS) life at varying moisture concentrations. The PS test was run on a 10 cm layer of charcoal in a tube with an inside diameter of approximately 1.4 cm at a flow rate of 1 l/min/cm$^2$ of cross sectional area (1,000 cm/min linear flow). The inlet air contained 47 mg PS/l and 0 percent humidity. The breakpoint concentration was 0.01±0.003 mg/l. The PS life test, thus, measures the time, in minutes, that it takes for the level of chloropicrin in the effluent to increase to 0.01 mg/l. The results are summarized in Table III. The physical adsorption capacity decreased with an increase in moisture content.

TABLE III

| Moisture Impact on PS Removal | |
| --- | --- |
| Moisture Content (Percent) | Dry PS Life (Minutes) |
| <1.0 | 50 |
| 5.5 | 44 |
| 13 | 37 |
| 15 | 33 |

ASC Whetlerite carbon was tested with varying concentrations of triethylene diamine for its CK life, as received and aged, and chloropicrin (PS) life. The results are summarized in Table IV. The CK life, both as received and aged, increased with an increase in TEDA content, while the physical adsorption capacity, in terms of PS life, decreased.

TABLE IV

| Impact of Impregnant Strength On CK and PS Removal | | | | |
| --- | --- | --- | --- | --- |
| TEDA Concentration (Weight Percent) | CK Life (As received, Minutes) | CK Life (Aged, Minutes) | PS Life (Minutes) | Moisture Content of Impregnated Carbon (%) |
| 0.0 | 24 | 8 | 53 | 0.5 |
| 1.5 | 53 | 45 | 51 | 0.5 |
| 5.0 | 40 | 35 | 45 | 0.5 |
| 10.0 | 59 | 64 | 36 | 1.0 |

What is claimed is:

1. An activated carbon impregnated with at least one metal and impregnated in the absence of added water with 0.1 to 10%, by weight, of an amine compound selected from the group consisting of triethylene diamine, quinuclidine, and mixtures thereof, and having a moisture content after impregnation of 5.0% or less, by weight.

2. The activated carbon of claim 1, wherein said metal impregnant is selected from the group consisting of copper, silver, chromium and mixtures thereof.

3. The activated carbon of claim 1, wherein said carbon has a moisture content of 3.0 percent or less, by weight.

4. A process for impregnating carbon comprising allowing an amine compound selected from the group consisting of triethylene diamine, quinuclidine, and mixtures thereof, to sublime in the absence of added water in the presence of an activated carbon which has been impregnated with at least one metal.

5. The process of claim 4, wherein said sublimation is conducted in a container.

6. The process of claim 4, wherein said metal impregnant is selected from the group consisting of copper, silver, chromium and mixtures thereof.

7. The product produced by the process of claim 4.

8. A process for the removal of toxic gases from a gas stream comprising passing the gas stream through an activated carbon impregnated with at least one metal and impregnated in the absence of added water with 0.1 to 10 percent, by weight, of an amine compound, selected from the group consisting of triethylene diamine, quinuclidine, and mixtures thereof, and having a moisture content after impregnation of 5 percent or less, by weight.

9. The process of claim 8, wherein said carbon has a moisture content of less than 3.0 percent, by weight.

10. A process for the removal of toxic gases from a gas stream comprises passing the gas stream through an amine impregnated activated carbon which has been impregnated with at least one metal, which was prepared by allowing an amine compound, selected from the group consisting of triethylene diamine, quinuclidine, and mixtures thereof, to sublime in the absence of added water in the presence of an activated carbon which has been impregnated with at least one metal.

* * * * *